Figure 1:
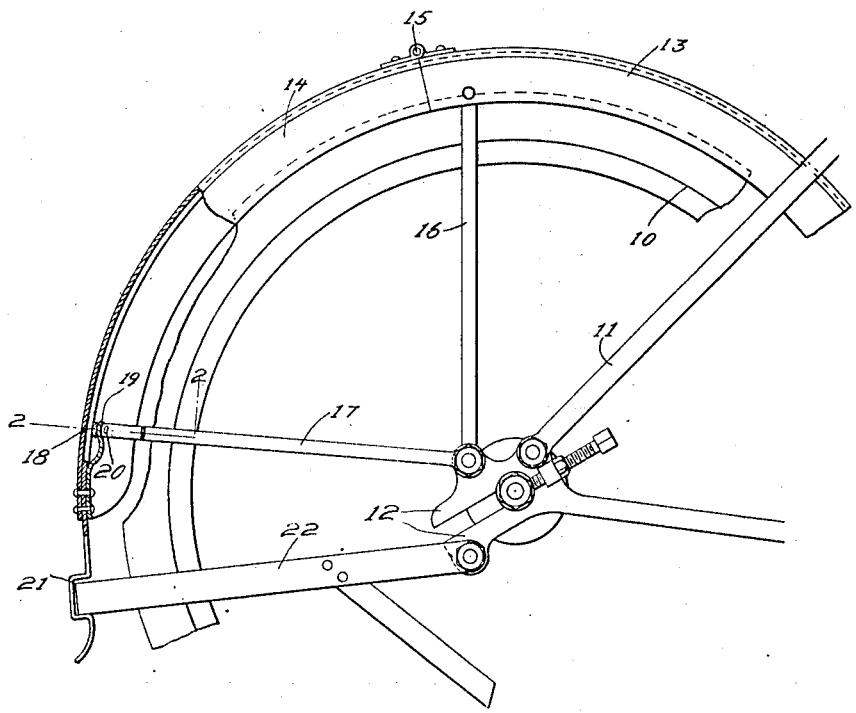

N. H. SCHICKEL.
MUD GUARD.
APPLICATION FILED APR. 16, 1912.

1,048,894.

Patented Dec. 31, 1912.

WITNESSES:
H. E. A. Raabe.
Harold C. Ayers

INVENTOR
Norbert H. Schickel
BY
C. W. Fairbank
ATTORNEY

UNITED STATES PATENT OFFICE.

NORBERT H. SCHICKEL, OF STAMFORD, CONNECTICUT.

MUD-GUARD.

1,048,894.  Specification of Letters Patent.  Patented Dec. 31, 1912.

Application filed April 16, 1912. Serial No. 691,172.

*To all whom it may concern:*

Be it known that I, NORBERT H. SCHICKEL, a citizen of the United States, and a resident of the city of Stamford, county of Fairfield, and State of Connecticut, have invented certain new and useful Improvements in Mud-Guards, of which the following is a full, clear, and exact description.

This invention relates to mud guards for use in connection with vehicle wheels and more particularly to a type of mud guard adapted for use in connection with bicycle wheels. By the term "bicycle", I, of course, include power-operated machines as well as machines operated by hand or foot pedal.

In bicycles and particularly in power operated bicycles commonly known as motor cycles, considerable inconvenience is ordinarily experienced in removing the rear wheel as it is necessary to lift up the entire frame to such a height that the wheel may be removed from beneath the mud guard. Furthermore difficulty is encountered in repairing or adjusting the tire except in those portions which are beneath the end of the mud guard. To overcome this it is necessary to make the mud guard or a portion thereof removable.

The object of my invention is to so construct or mount the mud guard and particularly the rear portion thereof that it will be normally rigidly secured in place but may be liberated and moved away from the wheel without the aid of any special tools.

In carrying out my invention I hinge the mud guard or the rear section thereof at one end and provide a support for the opposite end, which support has automatic locking connections with the guard. These connections are such that the guard may be readily released by reason of the resiliency of certain parts and may be swung upwardly away from the wheel to expose the latter. The mud guard cannot become accidentally loosened and there are no removable parts which may work loose or become lost.

Reference is to be had to the accompanying drawings illustrating a preferred embodiment of my invention which will be described in detail hereinafter. It is of course understood that other embodiments might be readily designed within the scope of my invention. In these drawings similar reference characters indicate corresponding parts in both views.

Figure 2:
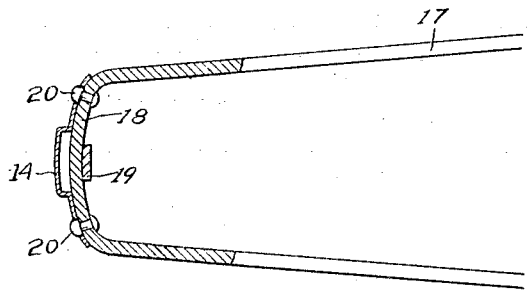

Figure 1 is a side elevation of a portion of a vehicle provided with a mud guard constructed in accordance with my invention, one portion thereof being broken away, and: Fig. 2 is a transverse section on the line 2—2 of Fig. 1.

In the accompanying drawings, there is shown the rear portion of a conventional type of motor cycle having a vehicle wheel 10 mounted between forks 11 and having its axle removably clamped between jaws 12 at the lower ends of the forks.

In the usual position above the wheel and between the forks, I mount my improved mud guard which is similar to other mud guards to the extent that it is formed of sheet metal curved longitudinally to substantially follow the periphery of the wheel and also curved transversely to somewhat follow the contour of the tire. This mud guard is formed of two sections 13 and 14 having abutting ends, the section 13 being rigidly secured in place at its forward end or between the forks 11, in any suitable manner not shown and at its rear end by the usual supports 16. These supports are in the form of bars on opposite sides of the wheel and extending from the mud guard to the jaws 12 adjacent to the hub of the wheel. The section 14 of my improved mud guard extends from a point substantially above the center of the wheel to a point substantially in the rear of the latter. At the upper end it is secured to the section 13 by a hinge 15 and at its lower end it is so supported that the latter may be detached without the aid of tools and may be swung upwardly away from the wheel and about the hinge 15 as a center to permit the repair, removal or ready adjustment of the wheel. For supporting the mud guard at its lower or free end, I provide a support 17 preferably including two bar sections on opposite sides of the wheel and united with a curved section 18 extending around the outer edge of the wheel. These bar sections are pivotally connected to a stationary portion of the frame as, for instance, one of the jaws 12; and there is a resilient automatically locking connection between the curved portion 18 and the mud guard. This curved portion normally lies in engagement with the inner surface of the mud guard section 14 adjacent to the lower end of the latter. An upwardly projecting finger or hook 19 on the inner surface of the mud guard prevents the outward or radial movement of the lower portion of the mud guard prior to the upward movement of the curved portion 18 of the support and this upward movement is normally prevented by an automatic locking device including two outwardly projecting studs 20 on the curved portion 18 of the support and adapted to enter openings in the mud guard adjacent to the side edges of the latter when the support has been moved downwardly between the finger and the body of the mud guard to the proper position.

The body of the mud guard is resilient and it is necessary to slightly distort or bend outwardly the edges of the guard to bring the support to its final position. The finger or catch 19 is of such length and so curved that the support may be readily moved downward between the finger and the guard and as it continues its downward movement, the studs will engage with the side edges of the mud guard and spread them apart until the studs reach the openings at which time they will spring into said openings. Furthermore the hook or finger 19 is resilient and presses the parts together independently of any resiliency in the guard itself. The support will thus be positively locked against upward movement and the mud guard cannot swing out until after the support has been moved up. The guard is very rigid at the lower end as the support engages with it at three points, namely, at the finger 19 and at the side edges of the guard. When it is desired to raise the mud guard, it is merely necessary to grip the side edges and spread them apart slightly to liberate the studs; and the support may then be swung upwardly past the end of the finger 19. The guard will then be free.

The lower end of the mud guard may, if desired, be provided with a depending spring hook 21 for normally supporting a stand 22 pivoted to the frame as is common in motor cycle construction. This spring hook 21 may be secured to the mud guard by the same rivets or bolts which secure the finger 19 and may be placed between the finger and the body of the guard so as to form, at the same time, the proper spacing between the latter to receive the support 17. The operating of this spring hook 21 will not tend to liberate the guard from its support.

Various changes may be made in the construction of my device, within the scope of the appended claims and without departing from the spirit of my invention.

Having thus described my invention, what I claim as new and desire to secure by Letters Patent is:

1. A mud guard for vehicle wheels, including a rigidly supported section, a second section hinged to one end thereof and a pivoted mud guard support detachably secured to the opposite end of the last-mentioned section.

2. A mud guard hingedly supported at one end and a detachable mud guard support at the opposite end.

3. A mud guard curved longitudinally and transversely, a member for supporting one end and a catch detachably connecting said guard and said support.

4. A mud guard hingedly supported at one end, a supporting member therefor at the opposite end and resilient automatically locking connections between said supporting member and said mud guard.

5. A mud guard having a movable body portion, a movable support therefor and resilient interlocking connections between said body portion and said support.

6. A mud guard including a stationary section, a movable section having one end hinged thereto, a support for the opposite end of said second-mentioned section and resilient interlocking connections between said support and said second-mentioned section.

7. A mud guard having a body portion hinged at one end and provided with a circumferentially extending finger adjacent to the opposite end and a support adapted to be received between said body portion and said finger.

8. A mud guard having a body portion, a hinge supporting one end of said body portion, a pivoted support for the opposite end of said body portion, said body portion being provided with a finger spaced therefrom for engagement with said support.

9. A mud guard having a body portion, a hinge supporting one end of said body portion, a pivoted support for the opposite end of said body portion, said body portion being provided with a finger spaced therefrom for engagement with said support and said support being provided with a projection adapted to engage with said body portion when said support is in position between said finger and said body portion.

10. A mud guard having a body portion, a hinge supporting one end of said body portion, a pivoted support for the opposite end of said body portion, said body portion being provided with a finger spaced therefrom for engagement with said support and spring pressed means for normally preventing the swinging movement of said support.

11. A mud guard having a body portion hinged at one end and having an opening adjacent to the opposite end and a support for said last mentioned end and having a projection normally resiliently held in said opening.

In testimony whereof I have signed my name to this specification in the presence of two subscribing witnesses.

NORBERT H. SCHICKEL.

Witnesses:
JOHN W. THOMPSON,
C. W. FAIRBANK.